United States Patent [19]

Iwaki et al.

[11] Patent Number: 5,067,447
[45] Date of Patent: Nov. 26, 1991

[54] METHOD FOR CONTROLLING HEAT OF A METAL HYDRIDE CONTAINER

[75] Inventors: Takashi Iwaki, Okazaki; Kazunori Itou, Ohbu; Hiroshi Matsumoto, Toyota; Kunitoshi Watanabe, Mizumaki; Hiroyuki Suzuki, Kitakyushu; Juzo Shibata, Aichi; Nobuyuki Uematsu, Hoya; Mamoru Takeda, Chiba, all of Japan

[73] Assignees: Kabushiki Kaisha Toyoda Jidoshokki Seisakusho, Kariya; Nippon Steel Corporation, Tokyo, both of Japan

[21] Appl. No.: 628,840

[22] Filed: Dec. 12, 1990

Related U.S. Application Data

[62] Division of Ser. No. 384,302, Jul. 24, 1989.

[30] Foreign Application Priority Data

| Jul. 26, 1988 | [JP] | Japan | 63-184535 |
| Sep. 22, 1988 | [JP] | Japan | 63-237852 |
| Sep. 22, 1988 | [JP] | Japan | 63-237857 |
| Nov. 21, 1988 | [JP] | Japan | 63-294172 |
| Nov. 21, 1988 | [JP] | Japan | 63-294173 |

[51] Int. Cl.$^5$ ............................................. F02B 43/00
[52] U.S. Cl. ...................................... 123/3; 165/39; 123/DIG. 12
[58] Field of Search ............... 123/3, 1 A, DIG. 12, 123/525; 165/39; 104.12; 62/46.2, 480

[56] References Cited

U.S. PATENT DOCUMENTS

| 4,016,836 | 4/1977 | Mackay et al. | 123/3 |
| 4,178,882 | 12/1979 | Anderson et al. | 123/3 |
| 4,211,537 | 7/1980 | Teitel | 123/DIG. 12 |
| 4,290,267 | 9/1981 | Buchner | 123/DIG. 12 |
| 4,302,217 | 11/1981 | Teitel | 123/3 |
| 4,336,213 | 10/1980 | Bernauer | 123/DIG. 12 |

Primary Examiner—Andrew M. Dolinar
Assistant Examiner—M. Macy
Attorney, Agent, or Firm—Brooks Haidt Haffner & Delahunty

[57] ABSTRACT

A hydrogen engine system comprises an engine, a metal hydride container connected with the engine and providing the engine with hydrogen, a heat intermedium providing mechanism connected with the hydrogen occluding alloy container and providing the metal hydride container with heat intermedium, a first control mechanism connected with the heat intermedium providing mechanism and controlling the heat intermedium providing mechanism so that the temperature of the heat intermedium supplied to the metal hydride container be kept at a constant value, and a second control mechanism connected with the heat intermedium providing mechanism between the first control mechanism and the metal hydride container and controlling the amount of the heat intermedium supplied from the heat intermedium providing mechanism to the metal hydride container.

1 Claim, 12 Drawing Sheets

METHOD FOR CONTROLLING HEAT OF A METAL HYDRIDE CONTAINER

This is a division of application Ser. No. 07/384,302, filed July 24, 1989 still pending.

FIELD OF THE INVENTION

The present invention is related to a hydrogen engine system, a method for starting a hydrogen engine, a method for stopping a hydrogen engine, a metal hydride container, a method for controlling heat of a metal hydride container, a method for cooling a metal hydride container.

DESCRIPTION OF THE RELATED ART

In FIG. 14 is shown a hydrogen engine system utilizing metal hydride which is, for example, described in "A trial manufacture of an engine system utilizing metal hydride" at page 247 of a collection 851 of "Automotive Technique Academic Seminors" published by Society of Automotive Engineers, Inc. in May of 1985.

As shown in FIG. 14, an engine 61 is actuated with hydrogen generated in a metal hydride container 65 (which will be called a MH tank hereinafter), and in an exhaust heat exchanger 67 the heat of its exhaust gas is, via a heat intermedium pipe 72, transferred to heat intermedium circulating in the MH tank 65 at a constant quantity of flow.

The heat intermedium is heat-exchanged with metal hydride at the MH tank 65, and the MH tank 65 which has received heat releases hydrogen in accordance with the equilibruim conditions of the metal hydride determined by temperatures and pressures.

The heat exchanges at the MH tank are performed as described below;

Firstly, the heat flow $Q_{wm}$ can be attained as below;

$$Q_{wm} = (T_w - T_m)/R_{wm} \quad (1)$$
$$= 2(T_{win} - T_w)\gamma_w C_w F_w \text{ (kcal/h)},$$

on conditions of $T_w = (T_{win} + T_{wout})/2$, $T_w$: Average temperature of the heat intermedium in the tank, $T_{win}$: Average temperature of the heat intermedium in the tank, $T_{win}$: Temperature of the heat intermedium at an entrance of the tank, $T_{out}$: Temperature of the heat intermedium at an exit of the tank, $T_m$: Average temperature of the metal hydride in the tank, $R_{wm}$: Heat resistance between the heat intermedium and the alloy, $\gamma_w$: Specific weight of the heat intermedium, $C_w$: Specific heat of the heat intermedium, $F_w$: Quantity of flow of the heat intermedium circulating in the tank.

The alloy temperature $T_m$ can be attained as below;

$$T_m = \int (Q_{wm} - Q_{mt} - Q_m)/C_m \cdot dt \quad (2),$$

$$Q_m = \alpha \cdot F_e \quad (b\ 3),$$

on conditions of $\alpha$: Quantity of heat of hydrogen dissociation kcal/Nm $F_e$: Quantity of flow of the generated hydrogen, $Q_{mt}$: Quantity of flow of the heat lost at the surface of the tank, $C_m$: Heat capacity of the alloy.

If the MH tank 65 is heat-insulated, the $Q_{mt}$ can be low. Accordingly, when the MH alloy comes to a heat equilibrium, a relationship $Q_{wm} = Q_m$ can be attained according to the (2) equation, and hydrogen is generated in the amount corresponding to the quantity of heat transferred from the heat intermedium.

In such a system as described above, on purpose of having the pressure of hydrogen at the predetermined level, an inflow quantity of the exhaust gas into an exhaust heat exchanger 67 and its inflow heat quantity are controlled by an exhaust adjusting valve 68 which is actuated by the signals from a pressure controller 70. The temperature of the heat intermedium at the entrance side of the MH tank 65 will change in accordance with the changes of the inflow heat quantity into the exhaust heat exchanger 67.

For instance, if the pressure of hydrogen comes down below the predetermined level, the pressure controller 70 will operate the exhaust adjusting valve 68 to send the exhaust gas to the heat exchanger 67. As a result, the temperature of the circulating heat intermedium goes up gradually and heats the alloy in the MH tank 65. In this way, the amount of generated hydrogen increases, and the pressure of hydrogen can be restored.

On the contrary, if the pressure goes up above the predetermined level, it will do reverse.

In the system as described above, however, the time constant of the process in terms of the pressure controller 70 is large because of the heat capacity of the heat intermedium circulating system including the exhaust heat exchanger 67, and the unstable changes of hydrogen pressures unavoidably come about based upon such a time delay. Especially, when an engine load is suddenly changed, the pressure of hydrogen is also largely changed, and it can be a factor to impede a stable operation.

FIG. 15 shows the results of the operating simulations of the system shown in FIG. 14.

The axis of abscissas shows time (second), and the axis of ordinates shows temperature (°C.) and ten times muliplied pressure of hydrogen ($kg/cm^2G$). Engine loads are shown in the same figure, and full loads and idlings were repeated a few times. Just after starting the operation, hydrogen is generated excessively even at idling because hydrogen is occluded at its full amount at the start of the operation.

When the MH engine 61 comes to its full load, the hydrogen pressure is controlled around 8 kg/cm of a predetermined level. At 1,200 seconds, however, the hydrogen pressure exceeds the predetermined level in large amount according to a rapid decrease of the engine load.

After that, during a long idling, the hydrogen pressure is lowered because a little lack of heat quantity of the exhaust gas prevents the intermedium temperature from going up. About 6 minutes after a second full load at 3,500 seconds, the hydrogen pressure manages to come to the predetermined level, but unstable changes of the hydrogen pressure can not stop.

In general, a driving mechanism of a hydrogen engine, for example, that of a hydrogen engine with carburetors, has a pipe connecting a MH tank with the engine, and after hydrogen gas is pressure-adjusted by a regulator provided at the pipe, the gas goes from the carburetor through an intake manifold to the inside of a combustion chamber where the gas is ignited by sparks of a spark plug. Thus, the hydrogen gas is exploded to start the engine.

An igniter has to be turned off to cease sparking the spark plug so that the engine stop. At almost the same time the metal hydride stops being heated and the supply of hydrogen gas to the engine is cut off.

However, the hydrogen gas in the pipe on its way to the engine is not burned and does not exhaust out of the engine just when the engine stops. Accordingly, there remains hydrogen gas in the regulator, the carburetor, and the intake manifold of the engine. When the engine restarts, the explosion outside the combustion chamber occurs, which is usually called a backfire, because the residual hydrogen gas makes hydrogen density higher at the start of sparking. Ways to develop the art to prevent the backfire at the start of the engine have been considered because the continuous backfires make the engine stop.

As one of metal hydride tanks (MH tanks), the one which is shown in FIGS. 16 and 17 is well known (Japanese Laid-Open Patent Publication No. 62-49100).

The MH tank 81 comprises a tank body 82 of cylindrical shape in which metal hydride M of fine grain is previously provided. The metal hydride M occludes and releases hydrogen gas in response to the heat exchanging reaction. A hydrogen gas introducing entrance 82a is provided at a bottom of the tank body 82, and a hydrogen gas discharging exit 82b is provided at a top of the tank body 82. In the tank body 82 are provided a shelf 85 having a cylindrical frame 83 and plural hydrogen filters 84 which form stories in the shelf 85, by which the inside of the tank body 82 is divided into many chambers.

In the tank body 82 is provided a pipe 86 having heat intermedium circulating therein which goes through the inside of the tank body 82 in order to exchange heat with the metal hydride M.

In order that the metal hydride M which has previously occluded hydrogen gas might release the hydrogen gas, heat intermedium such as hot water is sent into the pipe 86, and the heat of the intermedium as reaction heat brings about heat exchanging reaction, therefore, the metal hydride M releases the hydrogen gas. The generated hydrogen gas, then, goes out of the tank body 82 through the hydrogen gas discharging exit 82b.

On the other hand, in order to have the metal hydride M, which has already released the hydrogen gas, occlude the hydrogen gas again, heat intermedium such as cold temperature water circulates in the pipe 86 while the hydrogen gas keeps coming in from the hydrogen gas introducing entrance 82a. Accordingly, the metal hydride M occludes the hydrogen gas, and the reaction heat generated then at the metal hydride M is released out of the tank body 82 via the heat intermedium.

The metal hydride M then has cubical expansion at the same time of releasing the reaction heat, but its expansion stress is divided by the hierarchical shelf 85, so that the concentration of stress upon the tank body 82 and the like is prevented.

In the aforementioned MH tank 81, however, the hierarchical shelf 85 constituted of the frame 83 and the hydrogen filters 84 is provided in the tank body 82, and to install the shelf 85 is a complicated procedure considering the interference with the pipe 86. Consequently, there is a problem of higher cost because several manufacturing steps are required to install the shelf 85.

Moreover, there is another problem that the substantial capacity for containing the metal hydride M has to be smaller to the extent of the space required for the shelf 85 in the tank body 82.

By the way, as another MH tank adopted in a hydrogen engine for a vehicle, the one which is shown in FIG. 18 has been also known. The MH tank 91 has a substantially cylindrical tank body 92, in the inside of which the metal hydride M is previously contained. The generated hydrogen gas, as fuel, is provided into the hydrogen engine via a hydrogen gas pipe 93.

In this case, the heat intermedium for heating the metal hydride M is the cooling water which has been heated by cooling the hydrogen engine, and is the exhaust gas of high temperature exhausting from the hydrogen engine. The heat intermedium circulates in the spiral pipes 94 provided in the tank body 92. The heat exchanging efficiency can be improved because of this spiral shape of the pipes 94.

In the aforementioned MH tank 91, however, there is a problem of unstable movement of the metal hydride M having the form of fine grain because only the pipes 93 and 94 are provided in the tank body 92. In other words, when the tank body 92 is loaded on a vehicle which has to move hard during its operation, there is a probability that the metal hydride M moves around and is arranged unevenly in the tank body 92 because of the vibration. In this case, the heat exchanging effectiveness of the metal hydride M has to be lower. A large problem of uneven arrangement of the metal hydride M can be expected, especially, with a forklift which moves hard crosswise as well as back and forth.

SUMMARY OF THE INVENTION

It is an object of the present invention to provide a hydrogen engine system and a method for controlling heat of a metal hydride container which make the supply of hydrogen to the engine stable and enable the smooth operation of the whole system.

Another object of the present invention is to provide a method for starting a hydrogen engine which enables the smooth start of the engine by avoiding a backfire.

Further object of the present invention is to provide a method for stopping a hydrogen engine which ensures the fine start of the engine by avoiding a backfire at the restarting of the engine.

Another object of the present invention is to provide a metal hydride container and a method for cooling the container which can avoid the expansion stress on metal hydride at the time of occluding hydrogen gas, which prevents higher manufacturing cost, and which will not cause the substantial decrease of the capacity for having the metal hydride.

Further object of the present invention is to provide a metal hydride container which can prevent the uneven arrangement of metal hydride and can more effectively prevent the lowering of the heat exchanging efficiency of the metal hydride.

To achieve the above objects, a hydrogen engine system of the present invention comprises an engine, a metal hydride container which is connected with the engine and provides the engine with hydrogen, heat intermedium providing means which is connected with the metal hydride container and provides the metal hydride container with the heat intermedium, first controlling means which is connected with the heat intermedium providing means and controls the heat intermedium providing means so as to keep the temperature of the heat intermedium which is delivered into the metal hydride container at a constant value, and second controlling means which is connected with the heat intermedium providing means between the first controlling means and the metal hydride container and controls the supply amount of the heat intermedium from the heat intermedium providing means to the metal hydride container.

Other objectives of the present invention will become apparent with an understanding of the embodiments discussed later, and the appended claims. Further, many advantages not mentioned in this specification will become obvious to one skilled in the art upon application of the present invention.

DESCRIPTION OF THE PREFERRED EMBODIMENTS

The First Embodiment

Figure 1:
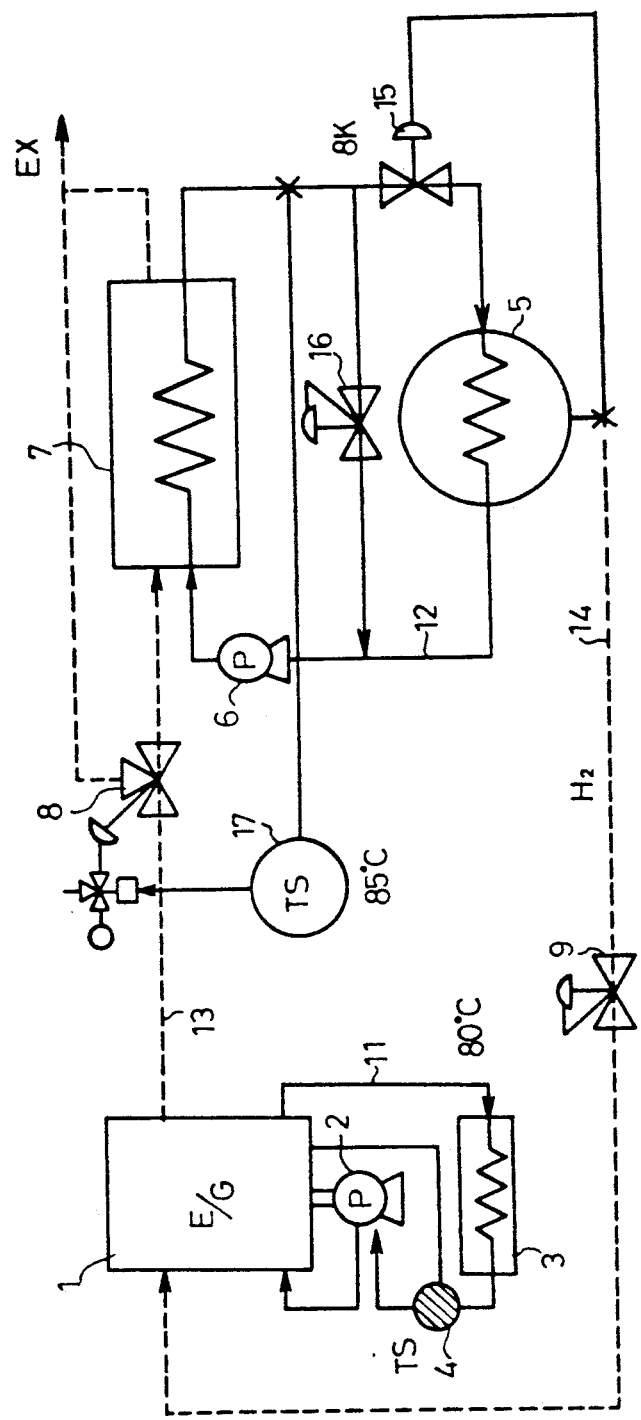
FIG. 1 is a schematic diagram showing a hydrogen engine system of the first embodiment of the present invention.

A hydrogen engine system of the first embodiment of the present invention is now described hereinafter referring to FIG. 1;

A radiator 3 is connected with a hydrogen engine 1 via a cooling water pipe 11 which is used for carrying water to cool the engine 1. A temperature switch 4 and a cooling water pump 2 are connected between the radiator 3 and the engine 1, and the cooling water cooled at the radiator 3 is supplied to the engine 1 by means of the pump 2. The temperature of cooling water of the present embodiment is maintained, for example, at 80° C. by means of the temperature switch 4.

A heat exchanger 7 is connected with the engine 1 via an exhaust pipe 13 and an exhaust adjusting valve 8. A metal hydride container (which is referred to as a MH tank hereinafter) 5 which has metal hydride therein is thermally connected with the heat exchanger 7 via heat intermedium which circulates in a heat intermedium pipe 12 by means of a circulator pump 6. A temperature switch 17 as a heat controlling device is connected with the heat intermedium pipe 12 at a heat intermedium entrance side of the MH tank 5. The temperature switch 17 controls the exhaust adjusting valve 8 to adjust the inflow amount of exhaust gas from the engine 1 to the heat exchanger 7, so that the temperature of the heat intermedium in the heat intermedium pipe 12 can be maintained substantially at the maximum level at the heat intermedium entrance side of the MH tank 5. The above temperature of the heat intermedium is kept at 85° C. in the present embodiment, but it goes without saying that this temperature value can change corresponding to heat intermedium.

At the heat intermedium entrance side of the MH tank 5, an adjusting valve 15 is provided at the heat intermedium pipe 12 and adjusts the inflow amount, into the MH tank 5, of the heat intermedium heated at the heat exchanger 7. At the heat intermedium pipe 12 between the upstream side of the adjusting valve 15 and a heat intermedium exit side of the MH tank 5, is provided a valve 16 which bypasses the heat intermedium in the heat intermedium pipe 12 in accordance with the inflow amount of the heat intermedium through the adjusting valve 15 into the MH tank 5 so as to prevent the circulation of the heat intermedium from stopping.

With the MH tank 5 is connected a hydrogen pipe 14 to provide the engine 1 with the hydrogen which the metal hydride in the MH tank 5 has generated. At the hydrogen pipe 14 is provided a pressure reducing valve 9 which maintains the pressure of the hydrogen supplied from the MH tank 5 to the engine 1 below a constant level. The adjusting valve 15 controls the inflow amount of the heat intermedium into the MH tank 5 corresponding to the pressure of the supplied hydrogen in the hydrogen pipe 14.

A method for controlling heat of the above hydrogen engine system is now described hereinafter;

Exhaust gas from the engine 1 goes through the heat exchanger 7 and heats the heat intermedium in the pipe 12 up to the maximum temperature while being controlled by the exhaust adjusting valve 8 in its inflow amount. The heated heat intermedium goes through the MH tank 5 and heats the metal hydride in the MH tank 5 in accordance with its inflow amount which is adjusted by the adjusting valve 15. Accordingly, the metal hydride generates hydrogen in the amount corresponding to the degree of the received heat, and the generated hydrogen is supplied to the engine 1 via the hydrogen pipe 14 while being adjusted, in its pressure, by the pressure reducing valve 9.

In the above hydrogen engine system, temperature of the circulating heat intermedium is always maintained at a maximum value if the capacity of heat source, the amount of exhaust gas in the present embodiment, is sufficient. Accordingly, the quantity of heat into the MH tank 5 is adjusted by changing the inflow amount of the heat intermedium into the MH tank 5.

Figure 14:
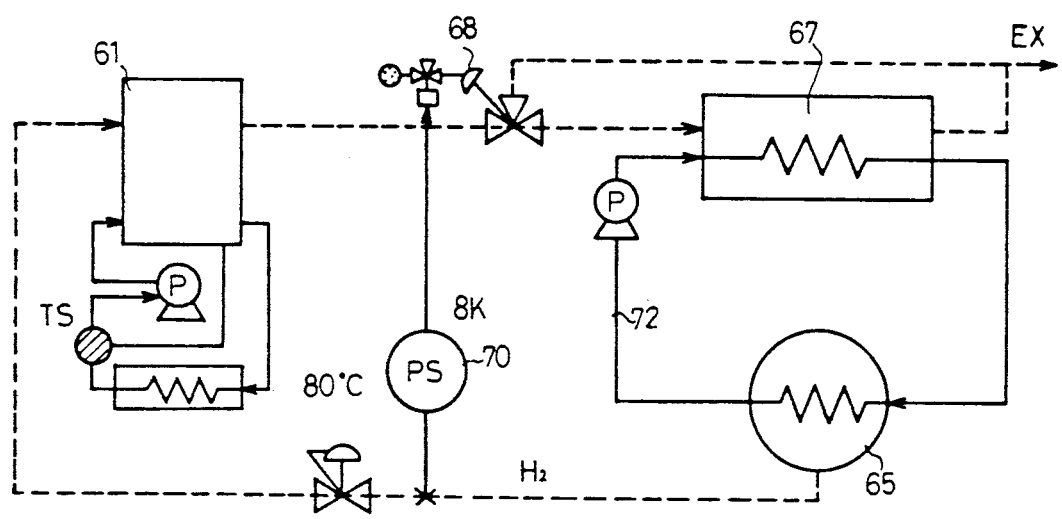
FIG. 14 is a schematic diagram showing a hydrogen engine system of a related art.

In a method for controlling heat of a hydrogen engine system of a related art as shown in FIG. 14, the quantity of heat into a MH tank is adjusted by heightening and lowering the temperature $T_w$ of warm water according to the equation (1). On the other hand, in the method for controlling heat in the present embodiment, the quantity of heat into the MH tank 5 is controlled by changing the inflow amount $F_w$ of warm water.

Consequently, the unstable changes of hydrogen pressure can be lessened because the inflow amount of the heat intermedium into the MH tank 5 can be instantly increased and decreased by opening and closing the adjusting valve 15 which has a quick response to the drastic changes on the amount of the hydrogen being used. At a sudden drop of the load of the engine 1 during idling or the like, the abnormal increase of hydrogen pressure can be minimized when the inflow of the heat intermedium into the MH tank 5 is stopped because the sensible heat of the heat intermedium in the MH tank 5 is low.

As described above, the method of the present embodiment for controlling heat can lower the unstable changes of hydrogen pressure, which often occur in the related art due to the sudden change of the load.

Figure 3:
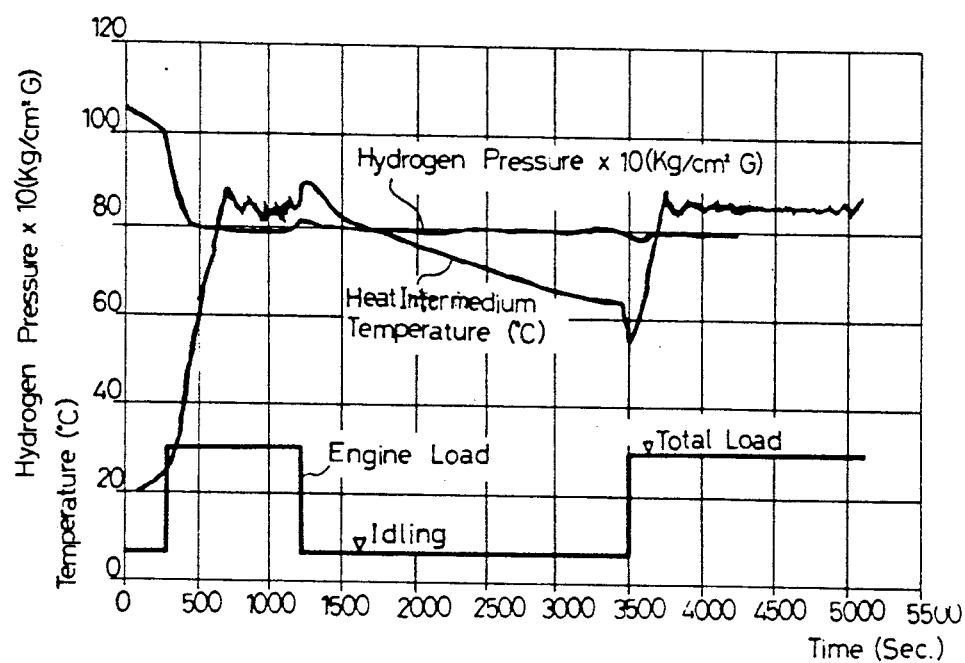
FIG. 3 is a graph showing the results of the operating simulations of the system shown in FIG. 1.
Figure 15:
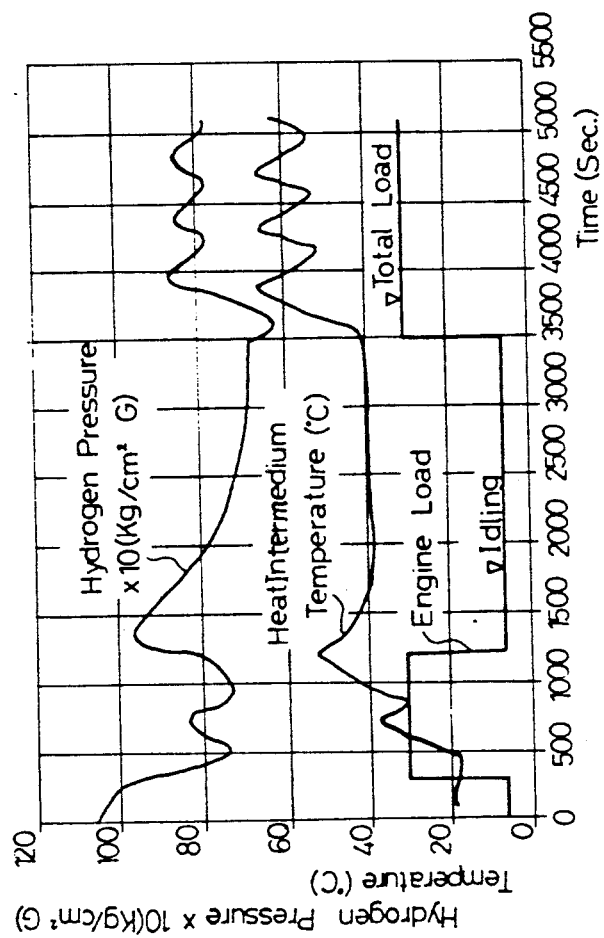
FIG. 15 is a graph showing the results of the operating simulations of the system shown in FIG. 14.

FIG. 3 shows the results of the operating simulations with the method of the present embodiment for controlling heat by using the same facility under the same operating conditions as those of the operating simulations of the hydrogen engine system as shown in FIG. 15.

As shown in FIG. 3, the pressure exceeds the predetermined level just after starting the operation because of the reasons as explained above. The hydrogen pressure after a full load operation is, however, shown to be extremely stable.

The gradual decrease of the heat intermedium temperature during a long idling is due to the lack of the quantity of heat supplied from the engine 1. But if the quantity of heat is sufficient, the temperature of the heat intermedium is maintained exactly at 85° C.

Figure 2:
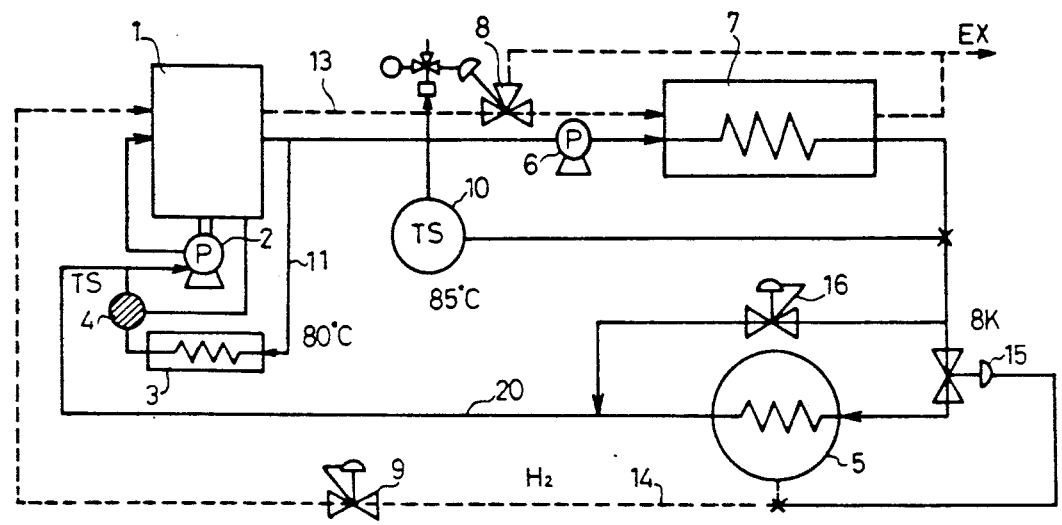
FIG. 2 is a schematic diagram showing a modified embodiment of the first embodiment.

In the modified embodiment of the first embodiment as shown in FIG. 2, a heat intermedium pipe 20 at the heat intermedium exit side of the MH tank 5 is connected with the cooling water pump 2 for delivering cooling water to the engine 1 instead of being connected with the circulator pump 6 which has the heat intermedium circulate. On the other hand, the circulator pump 6 is connected with the cooling water pipe 11 and delivers the hot cooling water as the heat intermedium, which has been heated while cooling the engine, into the MH tank 5 by way of the heat exchanger 7 and the adjusting valve 15. The rest of the structure is the same as that of the first embodiment.

In the modified embodiment, the cooling water as the heat intermedium which passes through the MH tank 5 is cooled down due to the endothermic effect, when hydrogen being generated, of the metal hydride in the MH tank 5. The heat intermedium is, then, supplied to the engine 1 via the cooling water pump 2, and cools the engine 1 with the cooling water from the radiator 3. Namely, the MH tank 5 as a heat sink assists the cooling effect of the radiator 3 on the engine 1. Accordingly, the capacity and the size of the radiator 3 can be small, so that the hydrogen engine system and consequently the whole vehicle which loads the hydrogen engine system can be manufactured in small size. Moreover, the hydrogen engine system of the present modified embodiment is suitable for the vehicle, which usually runs at low speed and tends to have its engine overheated, such as a forklift because the cooling of the engine 1 is sufficiently performed by both the radiator 3 and the MH tank 5.

In the aforementioned modified embodiment, the heat intermedium delivered from the engine 1 by the circulator pump 6 can be supplied directly to the MH tank 5 without passing through the heat exchanger 7, so that the heat exchanger 7 can be left out. Consequently, the size of the hydrogen engine system can be smaller.

The Second Embodiment

Figure 4:
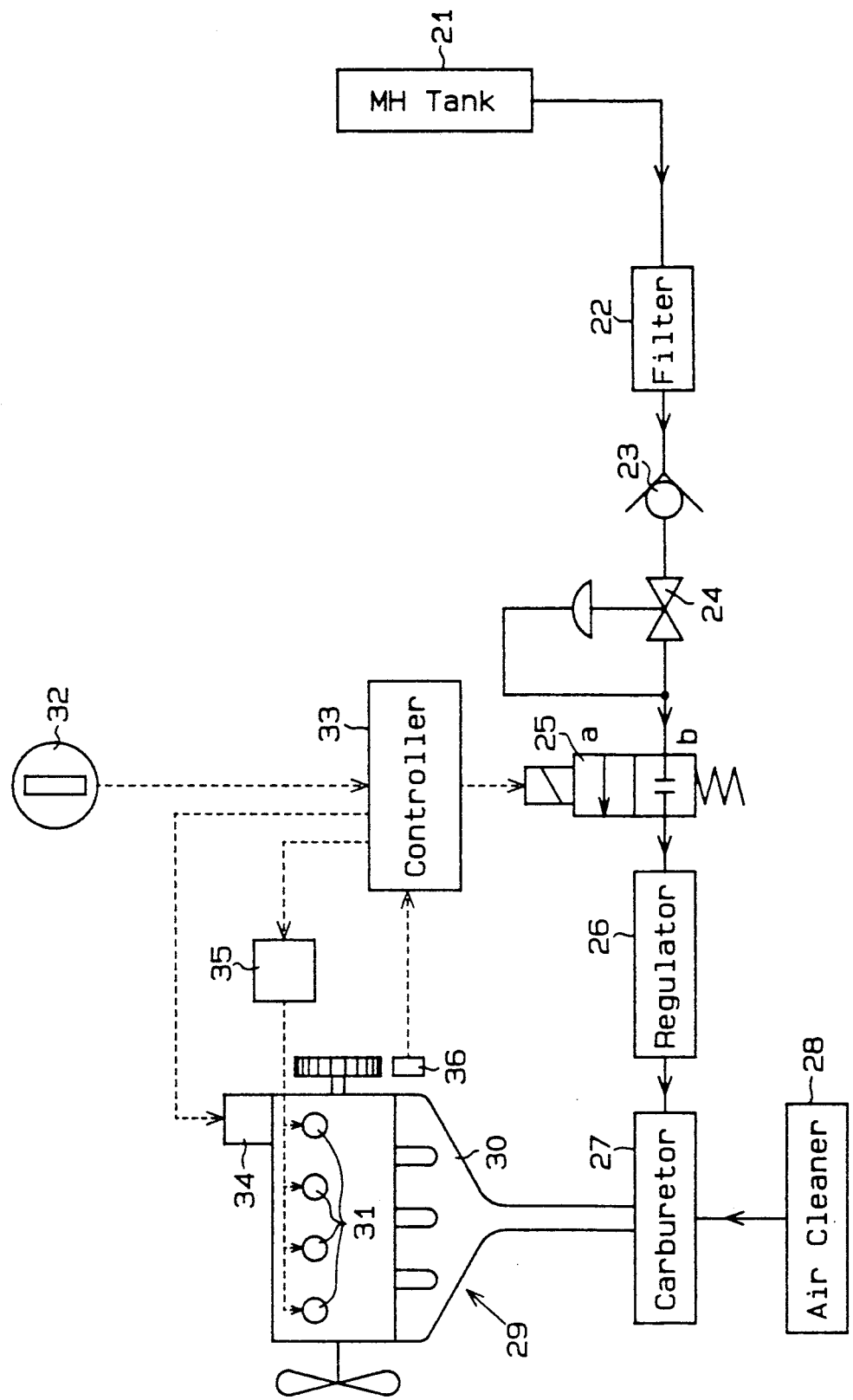
FIG. 4 is a schematic diagram showing an engine starter of the second embodiment.

The hydrogen engine system of the second embodiment of the present invention is described hereinafter in details referring to FIGS. 4 and 5;

As shown in FIG. 4, metal hydride is contained in a MH tank 21, and generates hydrogen gas while being heated by exhaust gas, cooling water of high temperature which has been heated by cooling an engine and so on. A filter 22 communicating with the MH tank 21 removes foreign materials such as fine alloy powders mixed in the hydrogen gas. The purified hydrogen gas is delivered to a pressure reducing valve 24 via a nonreturn valve 23 arranged at a lower stage. The nonreturn valve 23, when backfire occurs, prevents the flame from entering the MH tank 21. The pressure reducing valve 24 delivers the hydrogen gas to an electromagnetic control valve 25 after reducing the pressure of the hydrogen gas to the level which is predetermined based on the safety of a pipe and so on.

The electromagnetic control valve 25 can be changed over between two positions, a position a and a position b. At the position b shown in FIG. 4, the hydrogen gas delivered from the pressure reducing valve 24 is prevented from flowing downstream. When the electromagnetic control valve 25 is changed over to the position a, the hydrogen gas is pressure-adjusted approximately to the atmospheric pressure at a regulator 26 arranged at a lower stage, and then is delivered to a carburetor 27 at a lower stage. In the carburetor 27, the hydrogen gas is mixed with the air coming through an air cleaner 28. The hydrogen gas, then, goes through an intake manifold 30, and is compressed into a combustion chamber (not shown). In the combustion chamber, the hydrogen gas is burned at the sparking of a spark plug 31.

An electric formation for actuating the electromagnetic control valve 25 is now described;

A controller 33 actuates and stops a starter 34 of an engine 29 based on the on and off operations of an engine key switch 32, and further ignites and stops igniting the spark plug 31 by means of an ignitor 35 while counting time by means of a built-in timer therein according to a prestored program. The controller 33 outputs signals to the electromagnetic control valve 25 to magnetize and demagnetize the valve 25, and changes over the valve 25 to either the position a or the position b, so that the MH tank 21 and the engine 29 communicate with each other or are cut off from each other. The controller 33 is also connected with an engine rotation sensor 36 which detects the rotation of the engine 29, and monitors the rotation of the engine 29 according to signals from the rotation sensor 36.

Figure 5:
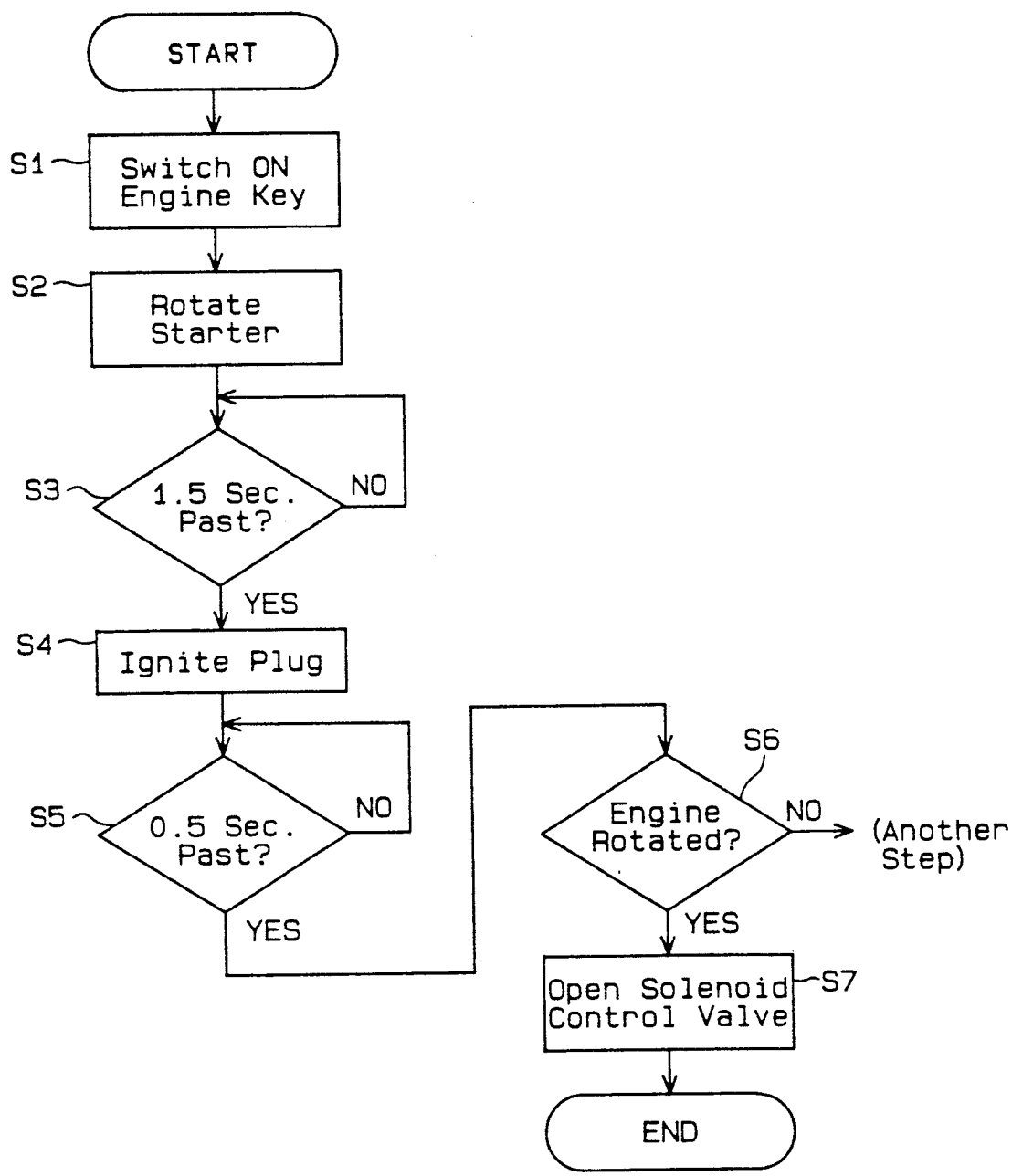
FIG. 5 is a flow chart showing a method for starting an engine by means of the starter of FIG. 4.

A method for controlling the start of the engine 29 as composed and formulated above is now described referring to FIG. 5.

Now, the engine 29 is being stopped, the electromagnetic control valve 25 is kept at the position b, and the MH tank 21 and the engine 29 are being cut off from each other. Then, when the key switch 32 is turned on to start the engine 29, the controller 33 confirms it at step S1 (Steps are referred to as S hereinafter.), and rotates the starter 34 to rotate the engine 29 idle at S2. The residual hydrogen gas, which has remained in the regulator 26, the carburetor 27, and the intake manifold 30 since the last stop of the engine 29, therefore exhausts out of the engine 29. The controller 33 counts the time of the idle rotation of the engine 29, and waits for a certain amount of time (It is 1.5 seconds in the present embodiment) till the hydrogen gas which has remained since the last stop of the engine is completely exhausted. After this amount of time has passed, the controller 33 sparks the spark plug 31 via the ignitor 35 at the next S4.

Moreover, after the predetermined time (0.5 seconds) has passed at S5, namely, at the time when the spark plug 31 is completely ready for being sparked, at S6 the controller 33 checks, by means of signals from the engine rotation sensor 36, whether the engine 29 is surely rotating or not. This is for avoiding such situation as the hydrogen gas is supplied to the engine 29 while the engine 29 is not rotating because the starter 34 does not rotate due to the death of the battery and so on. When it is judged that the engine 29 is rotating, the controller 33 sends signals to the electromagnetic control valve 25 at S7, and magnetizes the electromagnetic control valve 25 to change the positions from the position b to the position a. Then, the MH tank 21 and the engine 29 come to communicate with each other, and the hydrogen gas is delivered for the engine 29. Consequently, after the hydrogen gas is mixed with the air in the carburetor 27, the first explosion is performed in the combustion chamber of the engine 29, and the engine 29 starts running. By the way, when it is sensed that the engine 29 is not rotating at S6, the starter 34 and so on are considered to be out of order, and the controller 33 takes different actions which are not described in the present embodiment.

The engine 29 can stop as the key switch 32 is turned off to stop sparking the spark plug 31 and to change the positions of the electromagnetic control valve 25 from the position a to the position b via the controller 33, and as the metal hydride in the MH tank 21 stops being heated in an appropriate way.

As described above, the backfire is certainly prevented in the aforementioned embodiment because the hydrogen gas remaining between the electromagnetic control valve 25 and the combustion chamber of the engine 29 completely exhausts out of the engine 29 by rotating the engine 29 idle prior to the real start of the engine 29.

Though the present embodiment is composed in such a way that the electromagnetic control valve 25 is changed over between the positions a and b by the controller 33 either to have the MH tank 21 and the engine 29 communicate with each other or to have them cut off from each other, it is also possible to have such a formulation instead that the controller 33 has duty control on the electromagnetic control valve 25 at the start of the engine 29 to gradually increase the amount of the hydrogen gas flowing into the combustion chamber and to have the first explosion smoothly.

In the present embodiment, in order to supply the hydrogen gas under the condition where the hydrogen gas is able to be ignited, the electromagnetic control valve 25 waits for 0.5 seconds after the sparking of the spark plug 31 to open. The electromagnetic control valve 25, however, can open either at sparking or just before sparking as far as there is timing, at the start of the engine 29, to make it sure to have the first explosion after the hydrogen gas which has remained in the intake manifold 30 and in the engine 29 or so since the last stop of the engine 29 exhausts out of the engine 29.

Moreover, in the present embodiment, the judgment whether the residual hydrogen gas is still there or not is made based on time, but by means of detecting the number of rotations of the engine 29 rotated by the starter 34, the judgment on the presence of the residual hydrogen gas can be made based on the number of rotations.

The Third Embodiment

The third embodiment of the present invention is now described hereinafter referring to FIGS. 6 and 7.

The present embodiment shows a method for stopping the same hydrogen engine system as that of the second embodiment.

Figure 6:
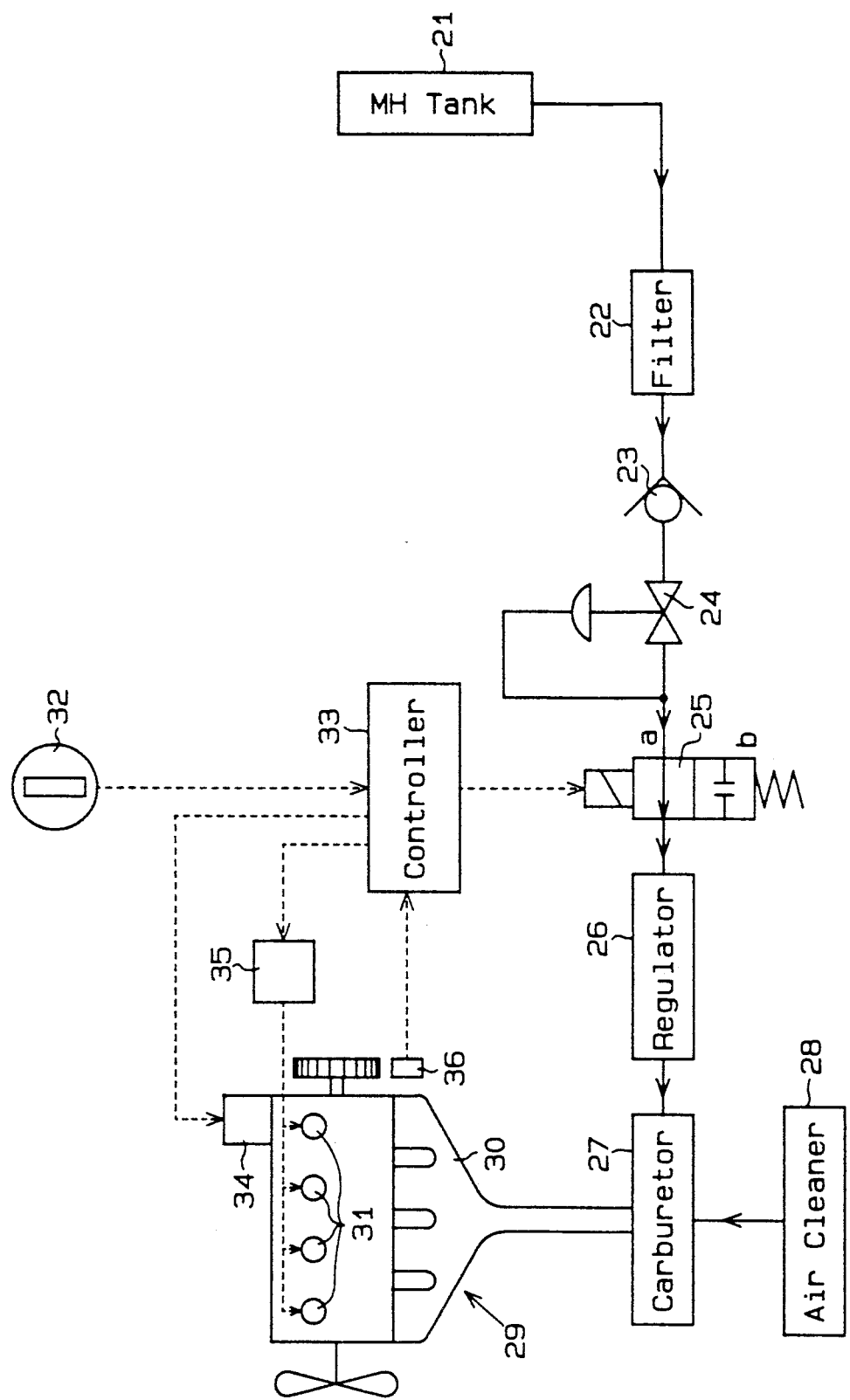
FIG. 6 is a schematic diagram showing an engine stopping device of the third embodiment.
Figure 7:
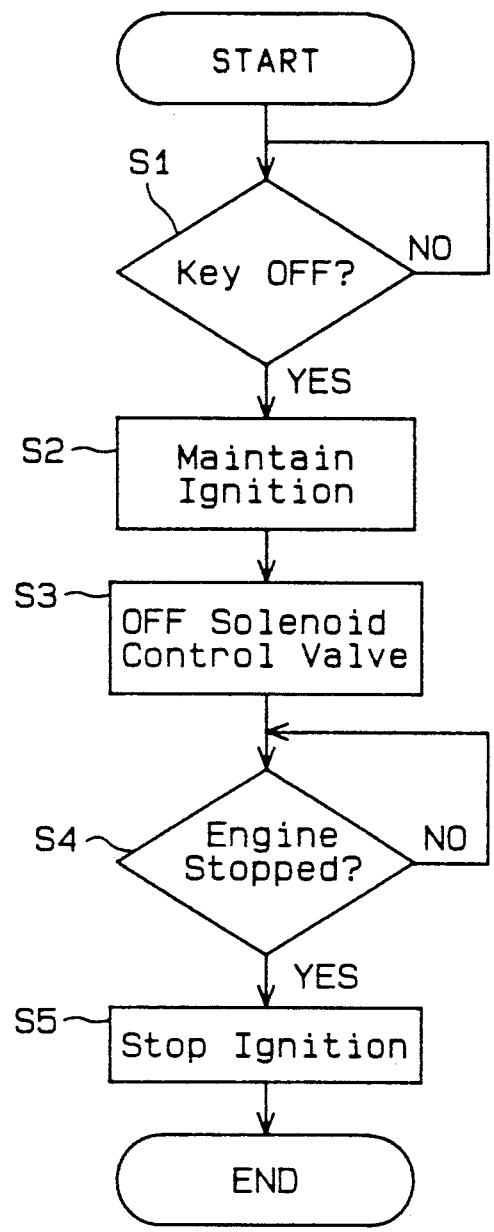
FIG. 7 is a flow chart showing a method for stopping an engine by means of the device of FIG. 6.

As shown in FIG. 6, the electromagnetic control valve 25 is kept at the position a, and the engine 29 runs with the hydrogen gas supplied from the MH tank 21. When the key switch 32 is turned off to stop the engine 29, the controller 33 confirms it at the step S1 (Step will be referred to as S hereinafter.), and changes the positions of the electromagnetic control valve 25 from the position a to the position b to cut off the MH tank and the engine 29 from each other at S3 while driving the ignitor 35 to keep the spark plug 31 of the engine 29 in sparking condition at S2. Accordingly, the hydrogen gas no longer remains in the regulator 26, the carburetor 27, the intake manifold 30 and so on because all the hydrogen gas remaining at the downstream side of the electromagnetic control valve 25 is compressed into the combustion chamber (not shown) with sucking actions of a piston (not shown) moving in the engine 29 and is burned therein to exhaust into the atmosphere.

After the aforementioned residual hydrogen gas exhausts out of the engine 29, if the controller 33 judges, according to the signals from the engine rotation sensor 36, that the engine 29 stops rotating at S4, the controller 33 stops sparking the spark plug 31 via the ignitor 35 and completes the stopping operation of the engine 29.

In the method for stopping the engine 29 as described above, all the hydrogen gas remaining in a route from the electromagnetic control valve 25 to the combustion chamber of the engine 29 is compressed into the combustion chamber and is exploded to exhaust after the hydrogen gas stops being supplied from the MH tank 21 to the engine 29 by means of a changing operation of the electromagnetic control valve 25. Consequently, no hydrogen gas remains in the engine 29 and its driving circuit at the stop of the engine 29, so that the backfire due to the residual hydrogen gas can be avoided when the engine 29 starts again.

In the present embodiment, the sparking operation is finished after the engine 29 stops, but it can be modified, for example, as described below;

(1) The sparking number, after the electromagnetic control valve 25 closes, of each cylinder of the engine 29 is determined previously, and the sparking operation does not continue after sparking is performed in the predetermined number.

(2) Once the engine 29 rotates in the predetermined number after the electromagnetic control valve 25 closes, the sparking operation no longer continues.

The Fourth Embodiment

A metal hydride tank (a MH tank) of the fourth embodiment of the present invention is now described in details hereinafter referring to FIGS. 8-10.

Figure 8:
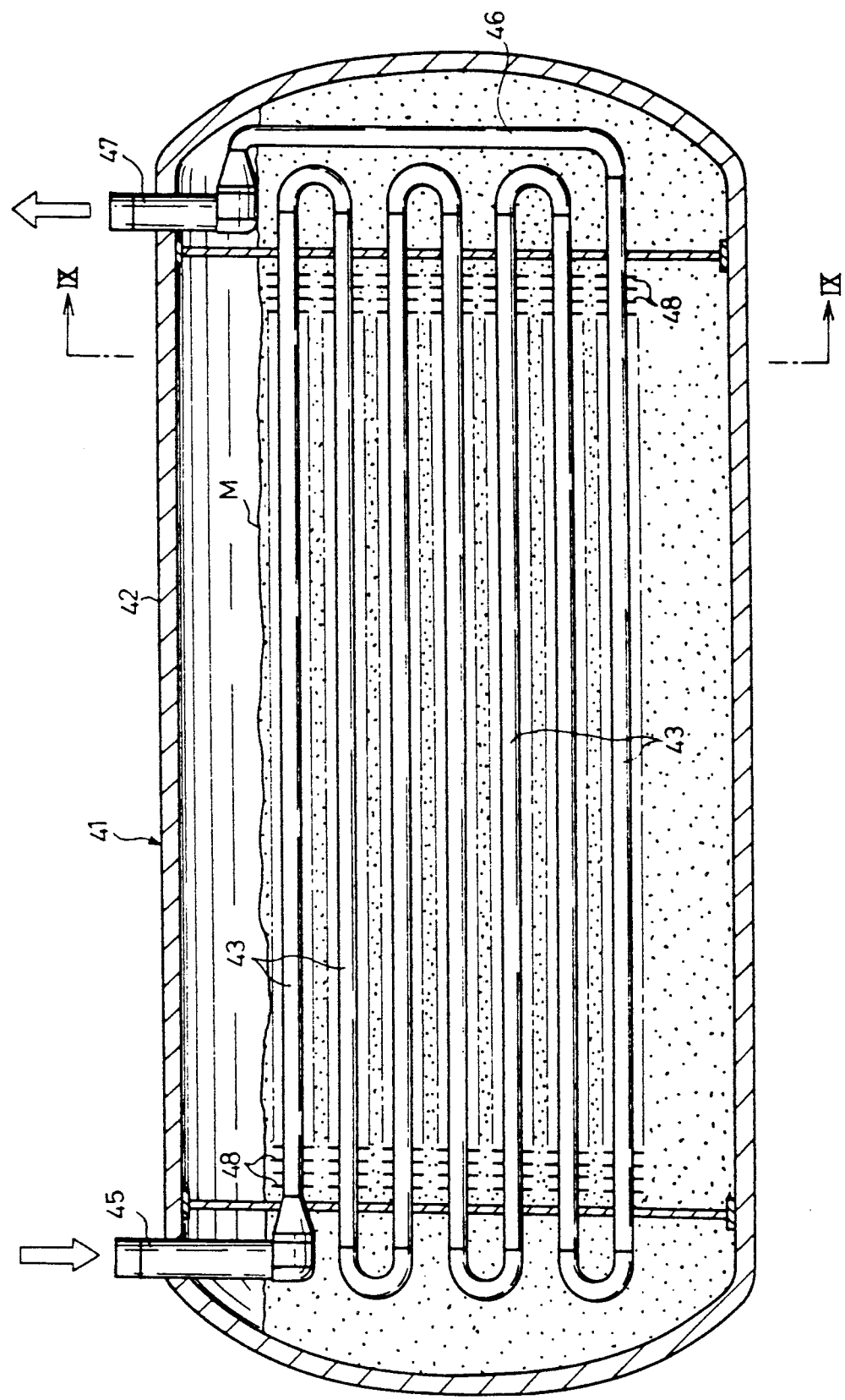
FIG. 8 is a partially broken side view showing a metal hydride container of the fourth embodiment.
Figure 9:
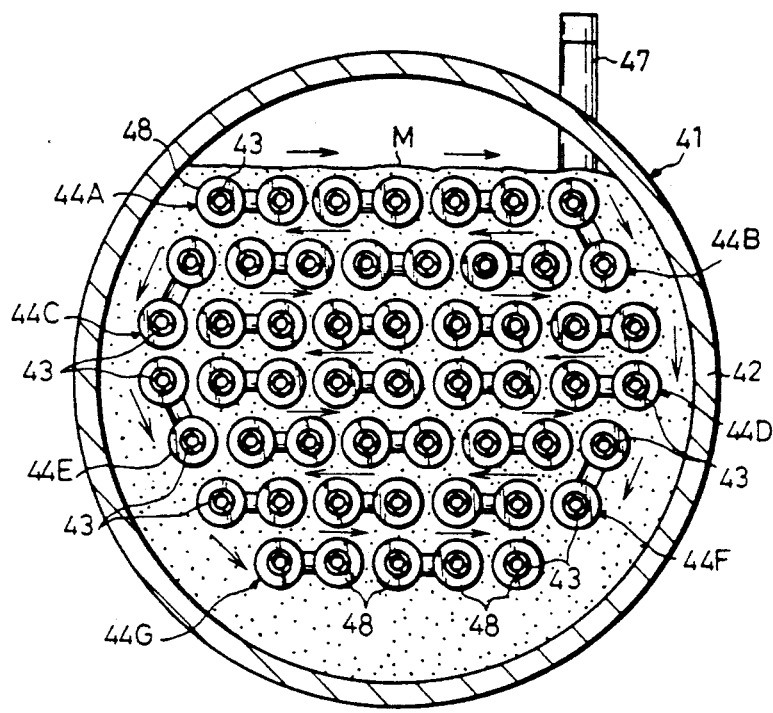
FIG. 9 is a sectional view taken along line IX—IX of FIG. 8.
Figure 10:
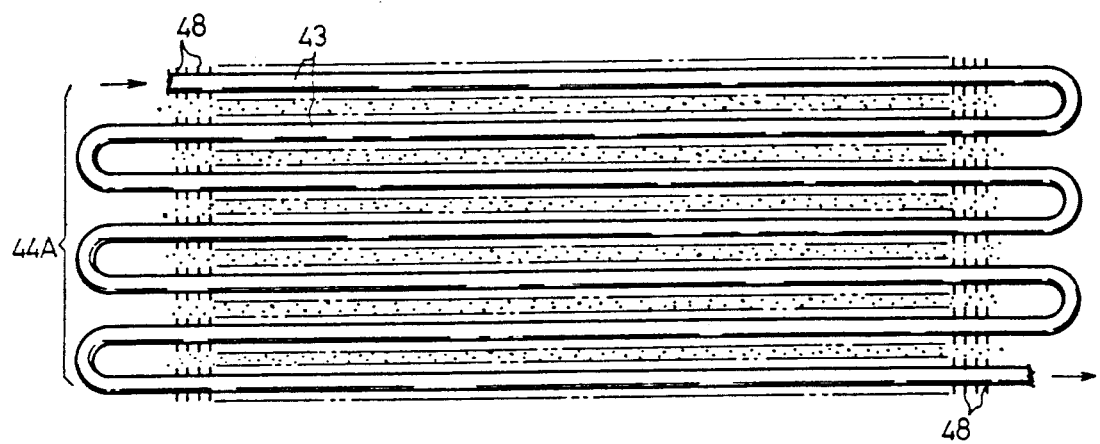
FIG. 10 is a partially broken plan view showing a group of pipes arranged at the top story.

As shown in FIGS. 8 and 9, a MH tank 41 has a cylindrical tank body 42 containing the metal hydride M of fine grain which releases and/or occludes hydrogen gas in reversible reactions accompanied with heat exchanges. In the tank body 42 are provided pipes 43 which act as cooling intermedium circulating routes going through the inside of the tank body 42 and coming back to the hydrogen engine (not shown) in order to heat or cool the metal hydride M. The pipes 43 contribute to the heat exchanging reaction by having low temperature water as cooling intemedium circulate therein when the metal hydride M occludes the hydrogen gas. When the metal hydride M releases the hydrogen gas, the pipes 43 also contribute to the heat exchanging reaction by having high temperature water (for example, the cooling water which has become of high temperature after cooling the hydrogen engine) as heating intermedium circulate therein. The released hydrogen gas is supplied to the hydrogen engine via a hydrogen gas pipe (not shown).

In the present embodiment, the pipes 43 are provided in the tank body 42 in plural lines in parallel to extend in the longitudinal direction thereof and in plural stories vertically.

Namely, as shown in FIG. 9, groups of pipes 44A-44G made of plural lines of the pipes 43 are provided in the tank body 42 from the top portion to the lower portion thereof in many stories. As shown in FIG. 10, in each of the groups of pipes 44A-44G, the pipes 43 are connected with each other in zigzag shape in its plan view. Moreover, as shown in FIG. 8, one end of each group of pipes 44A-44G in each story is successively connected with the other end of each group 44A-44G in such a way as the group of pipes 44A is connected with the group of pipes 44B which is arranged just below the group of pipes 44A, the group of pipes 44B is connected with the group of pipes 44C, and the other groups such as the group of pipes 44D, the group of pipes 44E, the group of pipes 44F, and the group of pipes 44G at the bottom story are successively connected with each other in a same manner in order to have the low temperature water go from one group to another.

As shown in FIG. 8, a low temperature water introducing entrance 45 is provided at one end of the group of pipes 44A at the top story, and a low temperature water discharging exit 47 is provided at one end of the group of pipes 44G at the bottom story via a connecting pipe 46 extending upward.

A number of fins 48 of disc shape are provided at both sides of each pipe 43 in the longitudinal direction thereof along the length of the pipes 43. The fins 48 are arranged having a predetermined interval between one another, and the metal hydride M can be filled in the intervals. The fins 48, therefore, do not have any substantial influence on the capacity for containing the metal hydride M.

In case that the metal hydride M which has already released the hydrogen gas occludes the hydrogen gas again, the hydrogen gas is led into the tank body 42 through the hydrogen gas introducing entrance (not shown), and the low temperature water is also led into the tank body 42 through the low temperature water introducing entrance 45. At this time, the metal hydride M, as shown in FIGS. 8 and 9, is agglomerated and is in a state of agglomerate layer leaving a little space at the top portion of the inside of the tank body 42 because of having released the hydrogen gas.

The low temperature water led through the low temperature water introducing entrance 45 is firstly led to one end of the group of pipes 44A at the top story and goes to the group of pipes 44B at the next lower story after running zigzag along the pipe 43 of the group of pipes 44A at the top story. The low temperature water also runs zigzag along the pipe 43 of the group of pipes 44B and goes to the group of pipes 44C at the next lower story. The low temperature water successively goes from the group of pipes 44C to the group of pipes 44G at the bottom story and then is led out of the tank body 42 via the connecting pipe 46 and the low temperature water discharging exit 47. Accordingly, the low temperature water gradually moves from the upper portion to the lower portion of the tank body 42 while moving in the longitudinal direction of the tank body 42 via the groups of pipes 44A-44G as shown as arrows in FIG. 9.

A reaction equation on the hydrogen gas ($H_2$) occlusion of the metal hydride M can be shown as follows;

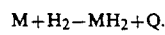

$$M + H_2 \rightarrow MH_2 + Q.$$

In the above equation, Q means reaction heat.

Accordingly, one of the important things on the hydrogen gas occlusion is to release the reaction heat Q out of the tank body 42 effectively, and removing the reaction heat Q from the tank body 42 outstandingly promotes the hydrogen gas occlusion of the metal hydride M. Another important thing is the relaxation of the expansion stress on the agglomerate metal hydride M, which has not been reacted, at the hydrogen gas occluding reaction.

In the present embodiment, the hydrogen gas occlusion by the metal hydride M, namely, the heat exchanging reaction begins around the group of pipes 44A at the top story which the low temperature water firstly comes through and which the reaction heat is firstly absorbed by, and gradually proceeds downward to an area around the group of pipes 44G at the bottom story. The cubical expansion of the metal hydride M accompanied with the hydrogen gas occlusion successively proceeds from the upper portion to the lower portion of the nonreacted agglomerate layer of the metal hydride M which is agglomerated in the tank body 42. In other words, the cubical expansion of the metal hydride M begins at the upper portion of the tank body 42 where there is sufficient room for the expansion, and gradually comes down to the lower portion.

As a result, the hydrogen gas occlusion by the metal hydride M can be performed with the room where the nonreacted agglomerate metal hydride M escapes. In other words, the hydrogen gas can be occluded while avoiding the generation of residual stress in the agglomerate layer of the nonreacted metal hydride M. The expansion stress on the nonreacted metal hydride M agglomerated at the lower portion of the tank body 42 is relaxed and, therefore, the stress concentration on the tank body 42 and the pipes 43 or so can be relaxed.

Moreover, in the present embodiment, the plural fins 48 are provided at the pipes 43, so that the metal hydride M is cooled effectively because of those fins 48 and that the efficiency of the heat exchange on the metal hydride M is improved.

Furthermore, the movement of the metal hydride M can be restricted though the tank body 42 vibrates in the longitudinal direction thereof, namely, in the direction along which the pipe 43 extends. In other words, the movement of the metal hydride M in the longitudinal direction of the tank body 42 is restricted and the metal hydride M can be prevented from being arranged unevenly in the tank body 42.

Figure 16:
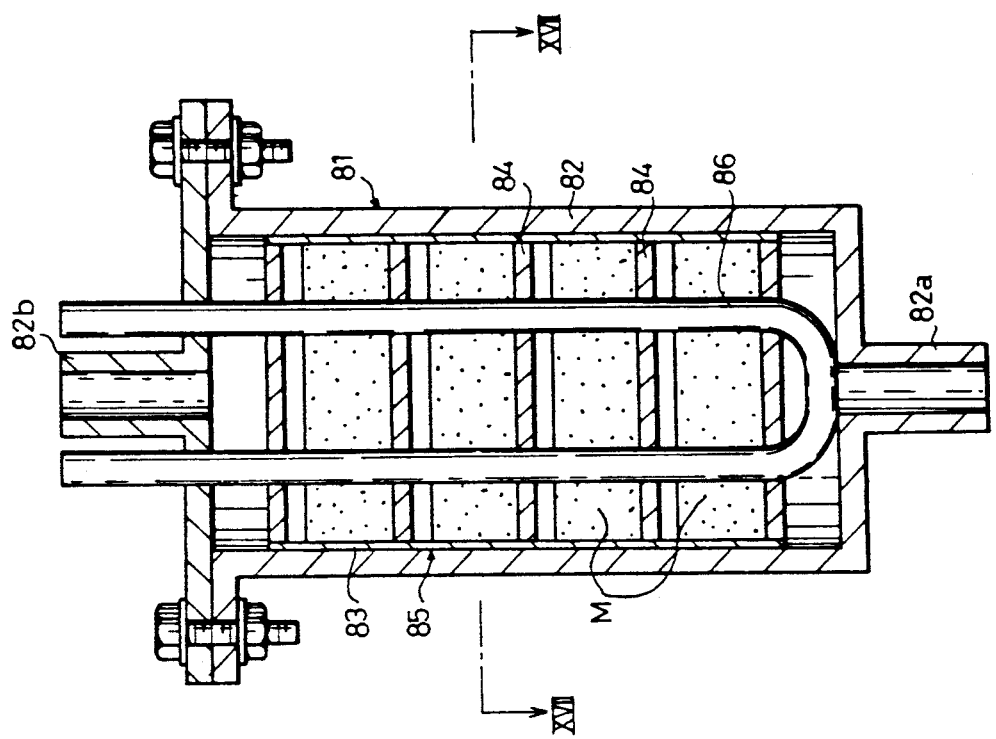
FIG. 16 is a sectional view showing a metal hydride container of a related art.

In the present embodiment as described above, the expansion stress on the metal hydride M can be relaxed only with the structure of the pipes 43 which directly contribute to the heat exchanging reactions of the metal hydride M. Some other members for relaxing the expansion stress, therefore, do not have to be provided in the tank body 42, unlike the alloy tank 81 of the related art as shown in FIG. 16 of which the tank body 82 has the hierarchical shelf composed of the frame 83 and the hydrogen filters 84.

Consequently, the manufacturing steps of the MH tank 41 can be simplified, and the abatement of the space of the tank body 42 for containing the metal hydride M can be prevented.

Comparing the MH tank 81 of the related art with the MH tank 41 of the present embodiment, the manufacturing cost for the present embodiment is half as much as that of the related art. As for the containing capacity of the metal hydride M, the capacity of the metal hydride M of the present embodiment is 1.6 times larger than that of the related art. The MH tank 41 of the present embodiment shows remarkable speriority over the related art in terms of the manufacturing cost and the substantial capacity.

On the other hand, in order to release the hydrogen gas out of the metal hydride M after the aforementioned hydrogen gas occulsion is completed, the high temperature water goes through the pipes 43 and the heat of the high temperature water is given to the metal hydride M as reaction heat. In this case, the released hydrogen gas is led out of the tank body 42 through a hydrogen gas discharging exit (not shown). In the present embodiment, a number of fins 48 are provided at the pipes 43, so that the heat exchange with the metal hydride M can be done efficiently, and that the hydrogen gas can be released effectively.

The present embodiment can be modified as follows;

(1) Though the group of pipes 44A–44G at each story is provided zigzag in a plan view in the present embodiment, they can also be provided in a latticed shape in a plan view.

(2) Though the pipes 43 at each story is provided as the group of pipes 44A–44G running zigzag, they can also be a single pipe.

(3) Though the present embodiment is so composed that the group of pipes 44A–44G at each story is connected with each other at their one ends to have the low temperature water run from the group of pipes 44A at the top story to the group of pipes 44G at the bottom story successively, it can be composed in such a way that the group of pipes 44A–44G at each story is provided independently and the circulation of the low temperature water is shifted successively, so that the low temperature water runs through the group of pipes 44A at first and runs through the group of pipes 44G at last.

(4) Though the MH tank 41 is used for a hydrogen engine system in the present embodiment, it can be applied for all the apparatuses and devices, other than the hydrogen engine system, which need the supply of hydrogen gas.

The Fifth Embodiment

The fifth embodiment of the present invention embodied in a MH tank of a hydrogen engine for a forklift is now described in details hereinafter referring to FIGS. 11 to 13.

Figure 13:
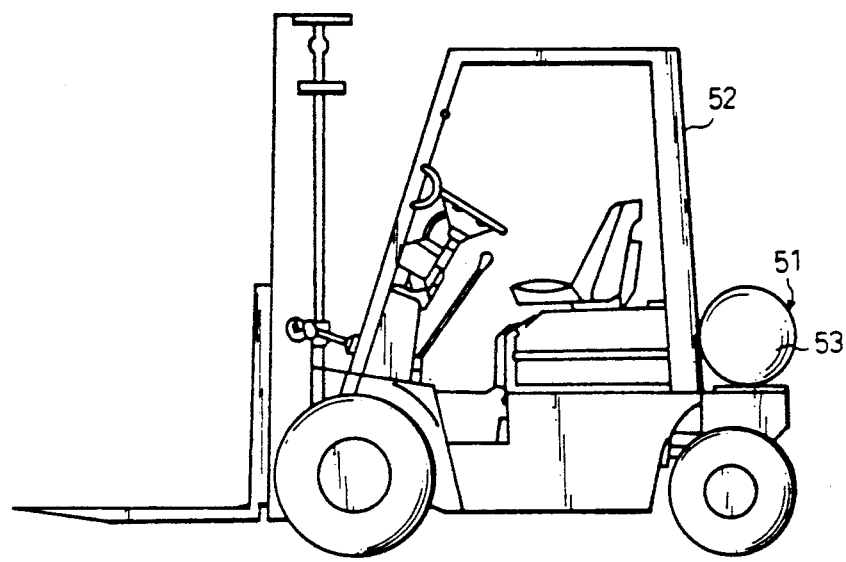
FIG. 13 is a side view showing a metal hydride container loaded on a forklift.

As shown in FIG. 13, a MH tank 51 of the present embodiment is provided at a rear portion of a forklift 52.

Figure 11:
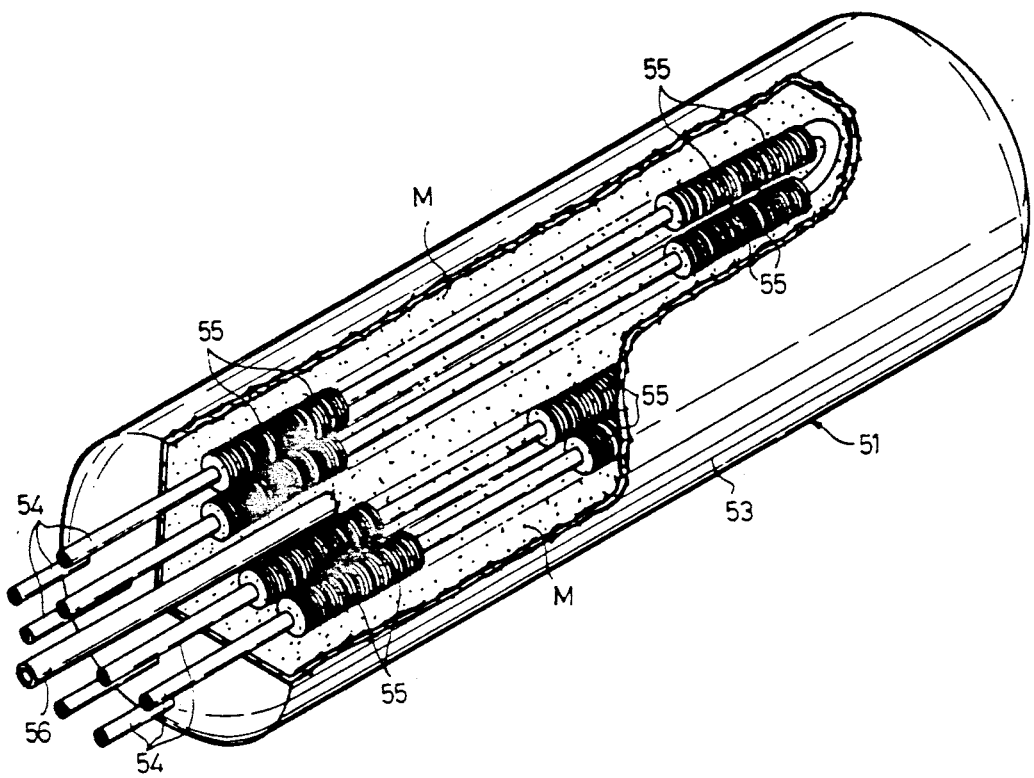
FIG. 11 is a partially broken perspective view showing a hydrogen occluding alloy container of the fifth embodiment.
Figure 12:
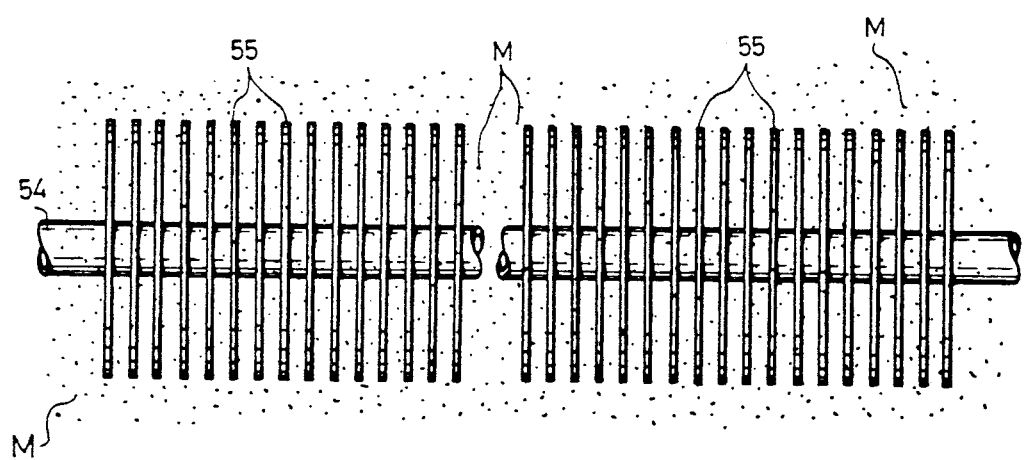
FIG. 12 is a partially broken plan view showing fins and a cooling water pipe.

As shown in FIG. 11, the MH tank 51 has a cylindrical tank body 53 previously containing the metal hydride M of fine grain which releases the hydrogen gas based on the heat exchanging reaction. A cooling water pipe 54, which goes through the tank body 53 and which comes back to a hydrogen engine (not shown), as a heating intermedium circulating route is provided to heat the metal hydride M in the tank body 53. The cooling water pipe 54 is for having cooling water as heating intermedium circulate therein. The cooling water of high temperature which is dicharged from the hydrogen engine after cooling the hydrogen engine is delivered to the tank body 53 and is used for the heat exchanging reaction of the metal hydride M in the tank body 53.

In the present embodiment, the cooling water pipe 54 is provided extending along the length of the tank body 53. As shown in FIG. 12, a number of fins 55 of disc shape are provided at both sides, in the longitudinal direction, of the cooling water pipe 54 along the length of the cooling water pipe 54 as well as the fourth embodiment. Each fin 55 is arranged having a predetermined interval between one and another, and the metal hydride M is filled in the intervals.

In the present embodiment, the tank body 53 is loaded in parallel with the crossing direction of the forklift 52 which moves hard in the crossing direction, therefore each fin 55 is arranged crossing the crossing direction of the forklift 52.

Moreover, the hydrogen gas which is released as a result of the heat exchanging reaction of the metal hydride M is supplied to the hydrogen engine via a hydrogen gas pipe 56 led from the tank body 53.

Accordingly, when the cooling water of high temperature discharged from the hydrogen engine goes through the cooling water pipe 54, the metal hydride M in the tank body 53 is heated, and the hydrogen gas is released due to the heat exchanging reaction. At this time, each fin 55 functions to heat the metal hydride M effectively, the efficiency of heat exchange on the metal hydride M is improved.

Moreover, if the tank body 53 vibrates with its hard movement in the longitudinal direction thereof, namely, in the crossing direction of the forklift 52 during the operation of the forklift 52, the movement of the metal hydride M is restricted because of each fin 55. In other words, the movement of the metal hydride M is restricted in the longitudinal direction of the tank body 53, and the metal hydride M can be prevented from being arranged unevenly in the tank body 53.

Figure 17:
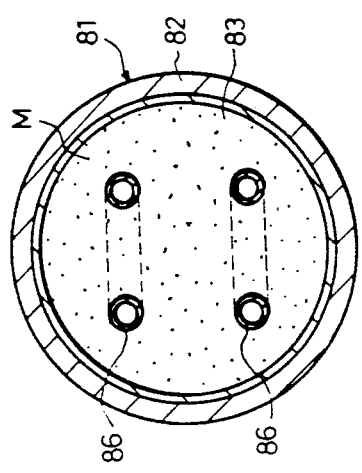
FIG. 17 is a sectional view taken along line XVII—XVII of FIG. 16.
Figure 18:
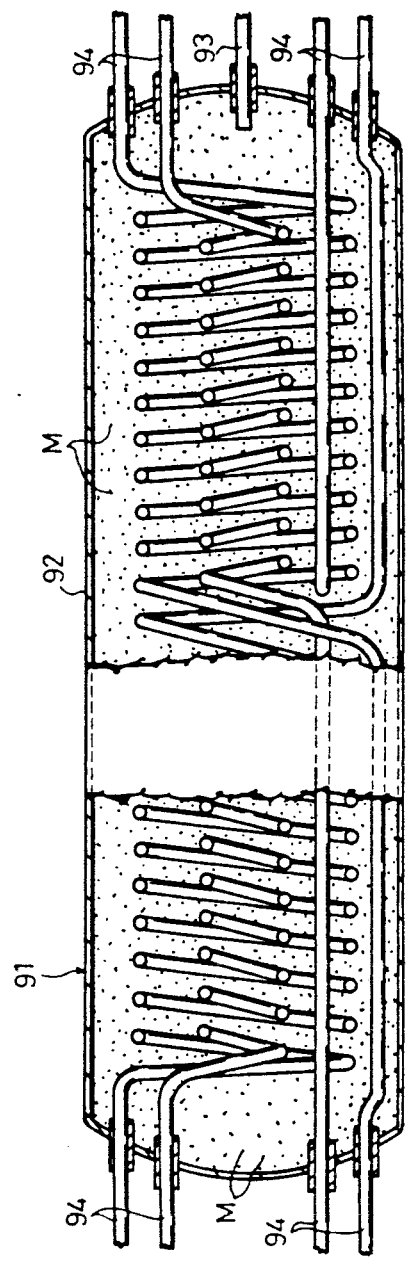
FIG. 18 is a partially broken side view showing a metal hydride container of a related art.

The results of comparing the MH tank 91 of the related art shown in FIG. 17 with the MH tank 51 of the present embodiment are now referred to; The comparison is made in terms of the uneven arrangement of the metal hydride M, namely, the differences of the layer levels of the metal hydride M between the right end and the left end of each MH tank 91, 51, which is examined after both the MH tanks 91 and 51 are loaded on the forklifts 52 and have been used there for three months. The difference of the layer levels of the related art is ±20%. On the other hand, that of the present embodiment is ±0%. There is no uneven arrangement of the metal hydride M in the present embodiment. Consequently, the MH tank 51 of the present embodiment has outstanding superiority over the MH tank 91 of the related art in terms of the uneven arrangement of the metal hydride M.

Moreover, the results of comparing the MH tank 91 of the related art with the MH tank 51 of the present embodiment under the same conditions as above in terms of the heat transfer efficiency of the metal hydride M is now described; The heat transfer efficiency of the related art is lowered by 35%. On the other hand, that of the present embodiment does not change. Namely, the lowering of the heat transfer efficiency, in other words, that of the heat exchange efficiency on the metal hydride M can be prevented because the uneven arrangement of the metal hydride M can be prevented in the MH tank 51 of the present embodiment. In addition, the efficient heating via the fins 55 can also prevent the lowering of the heat exchange efficiency more effectively.

The present embodiment can be modified as follows.

(1) Though the fins 55 are provided at the cooling water pipe 54 which extends along the length of the tank body 53 in the present embodiment, fins can also be provided at a cooling water pipe which extends crossing the length of a tank body.

(2) Though the fins 55 of disc shape are provided in the present embodiment, fins of square shape, triangle shape, sector shape and so on can also be provided.

(3) Though the cooling water of the hydrogen engine is used as heating intermedium in the present embodiment, the exhaust gas of the hydrogen engine can be used as heat intermedium.

(4) Though the MH tank 51 is used for the hydrogen engine of a forklift, the MH tank 51 can also be applied for the hydrogen engine of others and for all the apparatuses and devices which need the supply of the hydrogen gas.

As many apparently widely different embodiments of this invention may be made without departing from the spirit and scope thereof, it is to be understood that the invention is not limited to the specific embodiments thereof except as defined in the appended claims.

What is claimed is:

1. A method for controlling heat of a metal hydride container comprising;
   a first step wherein temperature of heat intermedium at a heat intermedium entrance side of the metal hydride container is controlled at a constant value,
   a second step wherein an amount of inflow of said heat intermedium, which has been controlled to be at the constant temperature, into said metal hydride container is controlled.

* * * * *